July 19, 1966 D. M. CHAPIN 3,261,987
LATCH CIRCUIT UTILIZING SINGLE TRANSISTOR
AND ENERGIZED BY ALTERNATING CURRENT
Filed June 6, 1963

INVENTOR
D. M. CHAPIN
BY Harry C. Hart
ATTORNEY

United States Patent Office 3,261,987
Patented July 19, 1966

3,261,987

LATCH CIRCUIT UTILIZING SINGLE TRANSISTOR AND ENERGIZED BY ALTERNATING CURRENT

Daryl M. Chapin, Basking Ridge, N.J., assignor to Bell Telephone Laboratories, Incorporated, New York, N.Y., a corporation of New York Filed June 6, 1963, Ser. No. 285,992
4 Claims. (Cl. 307—88.5)

Figure 1:
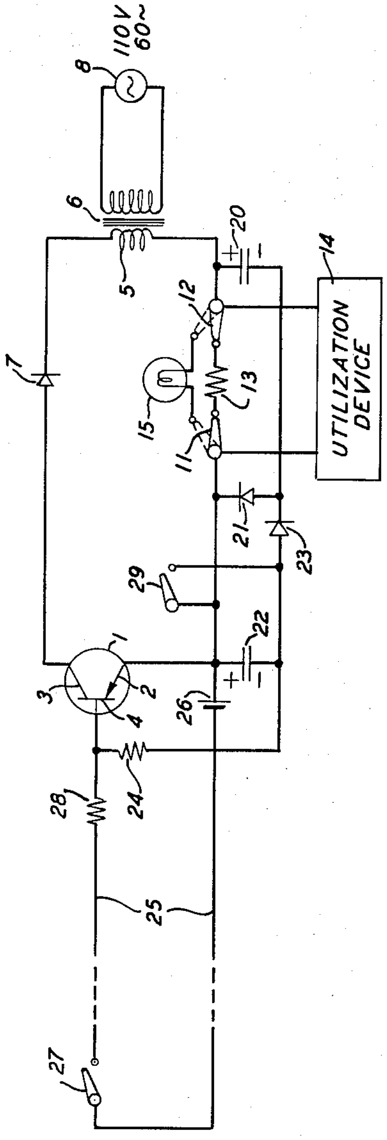

This invention deals with transistorized latch circuits.

A latch circuit, so called by analogy of its operation with that of a mechanical latch mechanism, is the electronic counterpart of an electromagnetic relay provided with a holding winding. It comprises an active element, typically a transistor capable of adopting two widely different states, conveniently designated the OFF state and the ON state, a suitable power source, a load, and provision for promoting regenerative feedback. Normally in the OFF state, it abides there until forcibly driven by a momentary signal of appropriate character into the ON state, whereupon current flows through the load. By virtue of the feedback provision, the flow of load current holds the active element in its ON state indefinitely—i.e., until the application of a resetting signal which restores it to the OFF state. When in addition to the ON-holding feedback, additional OFF-holding feedback is included, the circuit is appropriately termed a bistable one. With only ON-holding feedback it is more appropriately termed a latch circuit.

Because of its minute size, long life and advantageous switching characteristics, the transistor is well suited to serve as the active element of a latch circuit. The ON-holding feedback has in the past been secured in various ways—e.g., by cross-coupling of two transistors as in Logue 2,825,821 or by employment of a transistor of the current amplification variety as in Gehman 2,644,892. It may also be achieved with the aid of intercoupled coils wound on a saturable core as in Zarleng 3,070,710 or on a body of material having superconducting characteristics as in Wilson 3,061,738.

The present invention dispenses with the two transistors of Logue and with the current amplification requirement of Gehman and, at the same time, with the direct current power supplies of these systems. Like Zarleng, it operates with only an alternating current power supply and, at the same time, achieves the ON-holding feedback without resort to intercoupled windings, a saturable core, a superconductive body or the like.

Briefly, a load is connected in series with a source of alternating voltage, a half-wave rectifier such as a unidirectionally conducting diode and the emitter and collector electrodes of a transistor proportioned to remain in its OFF state prior to the application of an external bias to its base electrode. The load is shunted by a control path comprising a capacitor and a second unidirectionally conducting device or diode.

As long as the transistor is in its OFF state, no significant amount of current flows through the load, and no voltage is developed across it or on the capacitor. But, when by brief application of a bias voltage of appropriate polarity to the base electrode—e.g., by manual actuation of a pushbutton switch—the transistor is driven into its ON state, current flows through the emitter-collector path of the transistor and through the load. Because of the inclusion of the first diode, the load current flows in only one direction; i.e., it is a pulsating current in contrast to an alternating current. On the forward swings of the voltage of the source, the capacitor is charged through the second diode. Thus, a voltage of a particular polarity is developed on this capacitor. With the aid of a supplementary circuit arrangement, operative on the reverse swings of the source voltage, the voltage thus developed on the capacitor is transferred to the base electrode of the transistor with a polarity such as to hold the transistor in its ON state indefinitely. Thus the load voltage is self-sustaining and continues until the latch circuit is restored to its OFF state, e.g., by actuation of a restoring switch which disables the feedback and hence removes the bias voltage from the base electrode.

A common use to which a latch circuit such as the present one may be put is to generate an audible or a visible signal at a receiver station in response to the momentary actuation of an initiating signal originating at a distant transmitter station. For this purpose the transistor, the load, the power source, the associated circuits and the reset switch may advantageously be located at the receiver station, the initiating switch alone being located at the transmitter station. Thus, the utilization apparatus at the receiver station, turned on by a signaling party elsewhere, remains actuated and in operation until the attention of the signaled party has been called to it, whereupon the actuation will have served its purpose and the latch circuit may be restored to its OFF state by the signaled party actuating the reset switch.

In many situations what is required is that the load voltage shall act to illuminate a signal lamp, in which case the load itself may be constituted of the lamp thus to be illuminated. When the lamp is of the incandescent filament variety, of which the hot resistance is many times the cold resistance, this characteristic may be turned to account in further simplifying the transfer circuit.

Figure 2:
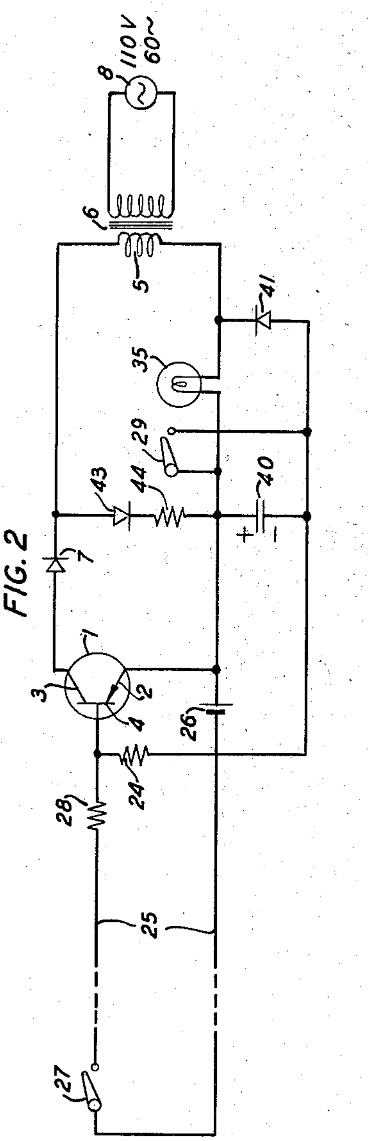

The invention will be fully apprehended from the following detailed description of illustrative embodiments thereof taken in connection with the appended drawings in which:

FIG. 1 is a schematic circuit diagram showing a transistor latch circuit proportioned to energize a load of any type; and FIG. 2 is a schematic circuit diagram showing a modification of FIG. 1 particularly adapted for energizing an incandescent lamp.

Referring now to the drawings, FIG. 1 shows a transistor 1 having an emitter electrode 2, a collector electrode 3 and a base electrode 4. Advantageously the transistor is of the type which conducts substantially no current in its emitter-collector path when its base electrode is held at the same potential as its emitter electrode. Thus, in the absence of an externally applied bias to the base electrode 4 it is in the OFF state. Many transistors that are readily available commercially manifest this property—e.g., the type SP147 transistor. Such a transistor requires only a small negative voltage increment $\Delta v$ to drive it into its conductive or ON state.

The collector electrode 3 of the transistor 1 is connected to one terminal of the secondary winding 5 of a power transformer 6, while the emitter electrode 2 is connected by way of a load to the other terminal of the secondary winding 5. A unidirectionally conductive device 7 such as a silicon diode is included in series between the load and the collector electrode. The transformer 6 may be proportioned to deliver, when energized from a sixty cycle power supply 8, an alternating secondary voltage of ten to twenty volts. Two alternative loads are shown. With the switches 11 and 12 thrown to their downward positions, the load is a fixed resistor 13 whose resistance may be of the order of 30 ohms. Its terminals are connected to a utilization device 14 proportioned to respond in any desired way, e.g., by ringing a bell or initiating a programmed series of operations, to the development of a voltage across the load resistor. When switches 11 and 12 are thrown to their upward positions, an incandescent lamp 15 is substituted as the load.

Shunting the load 13 or 15 is the series combination of a capacitor 20 and a second diode 21 of which the cathode is connected to the emitter terminal of the load, while the anode is connected to the capacitor. A voltage transfer circuit comprising a second capacitor 22 and a third diode 23 is connected to this load-shunting branch 20, 21, one terminal of the second capacitor 22 being connected to the emitter electrode 2, the other terminal of the second capacitor being connected to the anode of the third diode 23, and the cathode of the third diode 23 being connected to the anode of the second diode 21. A conductive path including a resistor 24 extends from the second terminal of the second capacitor 22 to the base electrode 4 of the transistor 1. A control path 25, including a small source 26 of direct current, e.g., a 1.5 volt "Penlite" battery, interconnects the emitter electrode 2 of the transistor 1 with the base electrode 4 through a control switch 27 and a protective resistor 28. As indicated by the broken lines, the control switch 27 may advantageously be located at a distance from the remainder of the apparatus, e.g., in another room. A resetting switch 29, normally open, is connected in shunt with the second capacitor 22.

Given that the initiating switch 27 is not actuated, the transistor 1 is initially in its OFF state. Hence the voltage developed in the secondary winding 5 of the transformer 6 fails to cause current to flow through the load resistor 13. On excursions of one polarity, the flow of current is prevented by the transistor 1 alone. On excursions of opposite polarity, current flow is also prevented by the blocking action of the first diode 7.

When the initiating switch 27 is momentarily actuated, the negative potential of the bias battery 26 is applied through the control path 25 to the base electrode 4 of the transistor 1, thus to drive it into its ON state. Current can now flow in a clockwise direction in the main loop of the circuit; i.e., from right to left in the load 13, but is prevented from flowing in the opposite direction by the diode 7. The load current thus consists of consecutive pulsations of current, always of the same sense, and these produce corresponding voltage drops from right to left in the load resistor 13. Each such pulsation also acts to charge the capacitor 20 through the second diode 21, thus to develop on the capacitor 20 a voltage of polarity shown by the algebraic signs. Discharge of the capacitor 20 on the reverse swings of the power source 8 is prevented by the second diode 21. Hence, in the course of a few cycles of the power source 8, a unipolar voltage is developed on the capacitor 20 of a magnitude equal to the peak value of the pulsating voltage across the load 13. On the reverse swings of the power source 8, while the second diode 21 is nonconductive, the third diode 23 conducts and hence the charge thus developed on the first capacitor 20 is transferred to the second capacitor 22. The base electrode 4 of the transistor being conductively connected through the resistor 24 to the lower terminal of the second capacitor 22, the voltage thus developed on the first capacitor 20 and transferred to the second capacitor 22 is continuously applied to the base electrode 4 of the transistor where it appears as a negative bias—i.e., a bias of the correct polarity to hold the transistor 1 ON, so that transistor current continues to flow. The charge on the first capacitor 20 is continually repenlished to replace the charge depleted by transfer to the second capacitor 22 and by the flow of current, if any, into the base electrode 4 of the transistor. Thus the ON condition, once initiated, is self-sustaining and the voltage thus developed across the load resistor 13 is passed to the utilization device 14 which responds in accordance with its construction and continues to do so until the latch circuit is reset—e.g., by momentary closure of the reset switch 29 which short-circuits the second capacitor 22 and hence removes the actuating bias from the base electrode 4 of the transistor.

For best operation under all circumstances the resistor 24 should be of a magnitude readily to pass such base electrode current as the transistor 1 in its ON state may require. Moreover, the time constant of the combination of the resistor 24 with the second capacitor 22 should be of the same order as the duration of one-half period of the driving source. Suitable magnitudes are, for the resistor 24, 100 ohms and, for the second capacitor 22, 100 microfarads. In order that a substantial fraction, e.g., one half or more, of the voltage developed on the first capacitor 20 shall be transferred to the second capacitor 22, the capacitance of the first capacitor 20 should be at least as great as that of the second capacitor 22, and preferably greater. At the same time, since only a few tenths of a volt are required as a base potential increment $\Delta v$ to switch the transistor 1 from its OFF state to its ON state, and since a voltage ten or more times as great is readily developed across the first capacitor 20, the circuit operates successfully even when the first capacitor 20 is of substantially less capacitance than the second capacitor 22.

In many situations what is required of the latch circuit is that it shall turn on a light in response to the initiating signal, which light then remains turned on until deliberately turned off. When this is required, the load resistor and the utilization device, taken together, may be constituted of a light source, illustratively an incandescent lamp 15, proportioned to be operated on 6–8 volts and one quarter ampere. The substitution is illustrated in FIG. 1 merely by throwing the switches 11, 12 to their upper positions. This substitution makes for wider margins of operation in that the hot resistance of an incandescent lamp filament is several times as great as its cold resistance. Thus, provided the initiating switch 27 has been actuated so that current flows through the lamp 15 in sufficient amount to bring it to incandescence and that the hot resistance of the lamp is of an appropriate magnitude, i.e., 30 ohms or so, development of the voltage on the first capacitor 20, transfer of this voltage to the second capacitor 22 and application of the resulting potential as a bias to the base electrode 4 takes place as described above in connection with the fixed load resistor 13. At the same time, prior to actuation of the initiating switch 27, while the transistor 1 is in its OFF state and the lamp 15 is cold, its much lower cold resistance—i.e., 6 ohms or so—provides additional insurance against development, due to passage of a small residual current through the transistor 1 in its OFF state, of a voltage of magnitude sufficient to charge the capacitor 20 and so develop a base bias voltage When a load such as the lamp 15 is to be employed, further simplification of the feedback circuit becomes possible. Referring to FIG. 2 the transistor 1, the first diode 7, the power source 8, the actuating circuit 25, 26, 27, 28 and the resetting switch 29 are as before, while the load is an incandescent lamp 35 of a type which develops a hot resistance of the order of 30 ohms while its cold resistance is of the order of 6 ohms or less. It is shunted by a capacitor 40 and a diode 41 connected together in series. A supplementary path constituted of a third diode 43 and a resistor 44 extends from the cathode of the first diode 7 to the emitter electrode 2 of the transistor, while the transfer capacitor and its associated diode of FIG. 1 are dispensed with. With this arrangement, the transistor 1 being in its OFF state and emitter-collector current thus being blocked, the voltage excursions of the source 8 of one polarity cause current to flow through the supplementary path 43, 44 and through the lamp 35. The resistor 44 of this supplementary path acts to restrict the magnitude of this current to a low value which fails significantly to heat filament of the lamp 35. Hence the voltage developed across the lamp 35, and so across the shunting path constituted of the capacitor 40 and the second diode 41, remains too small to provide a significant increment of potential to the base electrode 4 through the bias path resistor 24. But when the initiating switch 27 is actuated and the transistor 1 is driven into its ON state, as described above in connection with FIG. 1, the emitter-collector path of the transistor 1 becomes of much lower resistance than the bypath 43, 44. Hence, while the same small current flows through the bypath and the lamp for voltage excursions of the source that are of one polarity, much greater current flows through the lamp and through the transistor for voltage excursions of opposite polarity. Each time such a burst of current flows, from right to left through the lamp 35, the lamp temperature, and hence the lamp resistance, are raised. The thermal capacity of the filament of the lamp 35 is more than sufficient to cause the hot resistance thus developed in the lamp to hold over through the ensuing half cycle of the power source 8. The voltage developed across the hot lamp in the left-to-right direction acts to charge the capacitor 40 through the second diode 41 in the polarity shown by the algebraic signs. The lower terminal of the capacitor 40 being conductively connected by way of the resistor 24 to the base electrode 4 of the transistor, the voltage thus developed is applied to the base electrode as a bias of polarity such as to hold the transistor 1 in its ON state and thus to sustain the lamp current, the lamp resistance and the illumination, until the bias is removed—e.g., by closure of the reset switch 29 which shunts the bias-developing capacitor.

What is claimed is:

1. A latch circuit for providing a continuing indication in response to a momentary signal which comprises a transistor having an emitter electrode, a collector electrode and a base electrode, and proportioned to adopt an OFF state characterized by a high internal emitter-to-collector resistance in the absence of an external bias applied to its base electrode and to adopt an ON state characterized by a low internal emitter-to-collector resistance in the presence of a bias voltage $\Delta v$ applied to its base electrode, a source of alternating voltage, a load, and a first unidirectionally conducting device connected in series between the emitter electrode and the collector electrode, a circuit path connected in shunt with said load including a first capacitor and a second unidirectionally conducting device interconnected in series and proportioned to develop a voltage of a magnitude dependent on the resistance of the load and the magnitude of the transistor current, a second capacitor and a third unidirectionally conducting device interconnected in series between the emitter electrode of said transistor and the interconnection of said first capacitor and said second unidirectionally conducting device for transferring at least a substantial fraction of the voltage developed across said load, and conductive means extending from the interconnection of said second capacitor and said third unidirectionally conducting device to said base electrode for applying to said base electrode said transferred voltage as a bias of polarity to promote collector-to-emitter conduction, the magnitude of the load resistance being such that the product of the ON state transistor current by the load resistance is at least several times said bias voltage $\Delta v$, whereby, upon the momentary application of a conduction-promoting bias to said base electrode, the voltage developed across said load acts to maintain said bias and thus to sustain the flow of transistor current through said load.

2. A latch circuit for providing a continuing indication in response to a momentary signal which comprises a transistor having an emitter electrode, a collector electrode and a base electrode, and proportioned to adopt an OFF state characterized by a high internal emitter-to-collector resistance in the absence of an external bias applied to its base electrode and to adopt an ON state characterized by a low internal emitter-to-collector resistance in the presence of a bias voltage $\Delta v$ applied to its base electrode, a source of alternating voltage having two terminals, a two-terminal load of which the first terminal is connected to one terminal of the source while the second terminal is connected to the emitter electrode, a unidirectionally conducting device of which the cathode is connected to the other terminal of the source while the anode is connected to the collector electrode, a circuit path connected in shunt with said load and comprising a first capacitor and a second unidirectionally conducting device connected in series, one terminal of said first capacitor being connected to the first load terminal, the cathode of the second device being connected to the second load terminal, the anode of the device being connected to the other terminal of the capacitor whereby, on successive half cycles of the voltage of said source of one polarity, said capacitor is charged to a potential dependent on the resistance of the load and the magnitude of the transistor current, a second capacitor and a third unidirectionally conducting device, one terminal of said second capacitor being connected to the second terminal of the load, the other terminal of said second capacitor being connected to the anode of the third device, the cathode of the third device being connected to the anode of the second device, and circuit means interconnecting the other terminal of said second capacitor with said base electrode for transferring at least a substantial fraction of the voltage developed across said capacitor to said base electrode as a bias of polarity to promote collector-to-emitter conduction, the magnitude of the load resistance being such that the product of the ON state transistor current by the load resistance is at least several times said bias $\Delta v$, whereby, upon the momentary application of a conduction-promoting bias to said base electrode, the voltage developed across said load acts to sustain said bias, said conduction, and said load voltage.

3. A latch circuit for providing a continuing indication in response to a momentary signal which comprises a transistor having an emitter electrode, a collector electrode and a base electrode, and proportioned to adopt an OFF state characterized by a high internal emitter-to-collector resistance in the absence of an external bias applied to its base electrode and to adopt an ON state characterized by a low internal emitter-to-collector resistance in the presence of a bias voltage $\Delta v$ applied to its base electrode, a source of alternating voltage, a load, and a first unidirectionally conducting device connected in series between the emitter electrode and the collector electrode, a circuit path connected in shunt with said load and including an element arranged and proportioned to develop a voltage of a magnitude dependent on the resistance of the load and the magnitude of the transistor current, a bypath shunting the series interconnection of said load and said source of alternating voltage and including a second unidirectionally conducting device and a resistor connected in series, said second device being poled to pass current blocked by said first device, said resistor being proportioned to present a resistance several times as great as that of the emitter-collector path of the transistor, and a conductive connection extending to the base electrode of said transistor from that terminal of said element which is remote from the emitter electrode, the magnitude of the load resistance being such that the product of the ON state transistor current by the load resistance is at least several times said bias voltage $\Delta v$, whereby, upon the momentary application of a conduction-promoting bias to said base electrode, the voltage developed across said load and said element acts to maintain said bias and thus to sustain the flow of transistor current through said load.

4. A latch circuit for providing a continuing indication in response to a momentary signal which comprises a transistor having an emitter electrode, a collector electrode and a base electrode, a source of alternating voltage having two terminals, a two-terminal load of which the first terminal is connected to one terminal of the source while the second terminal is connected to the emitter electrode, a unidirectionally conductive device connected between the other terminal of said source and said collector electrode, a circuit path connected in shunt with said load and comprising a first capacitor and a second unidirectionally conductive device connected in series, a second capacitor and a third unidirectionally conductive device connected in series between said emitter electrode and the interconnection of said first capacitor and said second device, and a conductive connection extending from the interconnection of said second capacitor and said third device to said base electrode.

References Cited by the Examiner

UNITED STATES PATENTS

| | | | |
|---|---|---|---|
| 2,282,182 | 5/1942 | Gulliksen | 328—225 |
| 2,885,570 | 5/1959 | Bright et al. | 307—88.5 |
| 3,132,303 | 5/1964 | Rall | 307—88.5 X |
| 3,158,758 | 11/1964 | Pearson | 328—84 X |

ARTHUR GAUSS, *Primary Examiner.*

J. JORDAN, *Assistant Examiner.*